(12) United States Patent
Zhengdi

(10) Patent No.: US 6,751,247 B1
(45) Date of Patent: Jun. 15, 2004

(54) METHOD OF REDUCING INTERFERENCE, AND RADIO SYSTEM

(75) Inventor: Qin Zhengdi, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/341,736

(22) PCT Filed: Jan. 28, 1998

(86) PCT No.: PCT/FI98/00088

§ 371 (c)(1),
(2), (4) Date: Jul. 15, 1999

(87) PCT Pub. No.: WO98/36505

PCT Pub. Date: Aug. 20, 1998

(30) Foreign Application Priority Data

Jan. 29, 1997 (FI) .................................................. 970369

(51) Int. Cl.⁷ ................................................. H04B 1/69
(52) U.S. Cl. ...................... 375/130; 375/142; 375/146; 375/150; 375/346
(58) Field of Search ................................. 375/130, 140, 375/141, 142, 146, 147, 150, 346; 455/296

(56) References Cited

U.S. PATENT DOCUMENTS

| | | | | |
|---|---|---|---|---|
| 4,930,140 A | * | 5/1990 | Cripps et al. | 375/150 |
| 5,946,344 A | * | 8/1999 | Warren et al. | 375/140 |

FOREIGN PATENT DOCUMENTS

| | | |
|---|---|---|
| EP | 378 417 A3 | 1/1990 |
| JP | 8335898 A | 6/1995 |
| WO | WO 94/10774 | 5/1994 |
| WO | WO 95/03652 | 2/1995 |

* cited by examiner

*Primary Examiner*—Temesghen Ghebretinsae
(74) *Attorney, Agent, or Firm*—Squire, Sanders & Dempsey L.L.P.

(57) ABSTRACT

The invention relates to a method of reducing interference in a radio system comprising at least one base station and a subscriber terminal. The data to be transmitted is converted into symbols in a transmitter and each symbol is multiplied by a connection-specific spreading code composed of chips. The data to be transmitted on connections in a synchronizing phase is multiplied by a spreading code whose duration in time differs from the spreading code in the other connections.

16 Claims, 3 Drawing Sheets

METHOD OF REDUCING INTERFERENCE, AND RADIO SYSTEM

FIELD OF THE INVENTION

The invention relates to a method of reducing interference in a radio system comprising at least one base station and a subscriber terminal including a receiver and a transmitter in connection with one another, in which transmitter the data to be transmitted is converted into symbols and each symbol is multiplied by a connection-specific spreading code composed of chips.

The invention also relates to a radio system comprising at least one base station and subscriber terminals comprising a receiver and a transmitter arranged to multiply the data to be sent by a connection-specific spreading code, which data comprises symbols and which spreading code comprises chips.

DESCRIPTION OF THE PRIOR ART

In CDMA (Code Division Multiple Access), a narrowband signal of a user is multiplied to a significantly broader band by a spreading code. The users transmit simultaneously in the same frequency band. On each connection between the base station and a subscriber terminal, a different spreading code is used, and the signals of the users can be separated from one another in the receivers on the basis of the spreading code of each user. The spreading codes are chosen in such a way as to correlate with one another as little as possible. The signals multiplied by another spreading code do not correlate in an ideal case and do not restore to the narrow bandwidth, but appear as noise.

In a conventional CDMA, however, cross-correlations between different spreading codes are typically too high, since duration in time and usually also the length in chips of the mutually corresponding spreading codes is the same in different connections. This is a problem especially during a synchronizing phase which becomes more difficult because of the mutual interference between the users

BRIEF DESCRIPTION OF THE INVENTION

The object of the present invention is to implement a method and a radio system wherein a cross-correlation between spreading codes is reduced during a synchronizing phase, whereby synchronization becomes easier and it is also possible to reduce interference.

This object is achieved by the method introduced in the preamble characterized by multiplying the data to be transmitted of at least one connection in the synchronizing phase by the spreading code whose duration in time differs from the corresponding spreading code in other connections by some chips at the most in such a way that the cross-correlation of the spreading codes receives different values at different periods of time.

A radio system of the invention is characterized in that it is arranged to employ a spreading code in at least one connection in the synchronizing phase, the duration in time of the spreading code differing by some chips at the most from the corresponding spreading code in other connections in such a way that the cross-correlation of the spreading codes receives different values at different periods of time.

The method of the invention provides many advantages in a radio system. The cross-correlation of the spreading codes can be substantially reduced in the synchronizing phase, whereby synchronization is improved and interference is also reduced.

DESCRIPTION OF THE DRAWINGS

In the following, the invention is described in more detail with reference to the examples illustrated in the attached drawings, in which.

DETAILED DESCRIPTION OF THE INVENTION

The invention can be applied in any radio system employing a spreading code, for example in the CDMA system.

Figure 1:
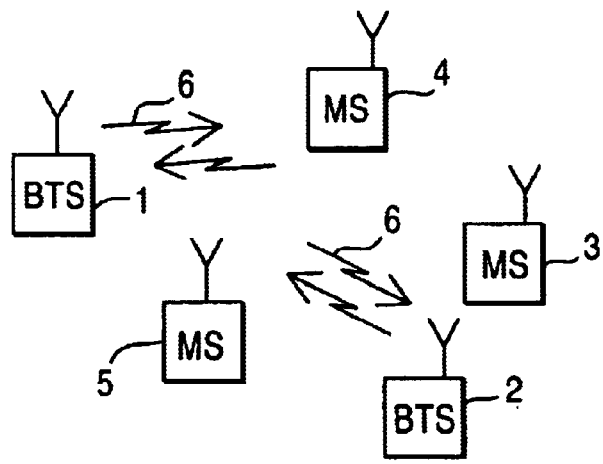
FIG. 1 illustrates a radio system.
Figure 2:
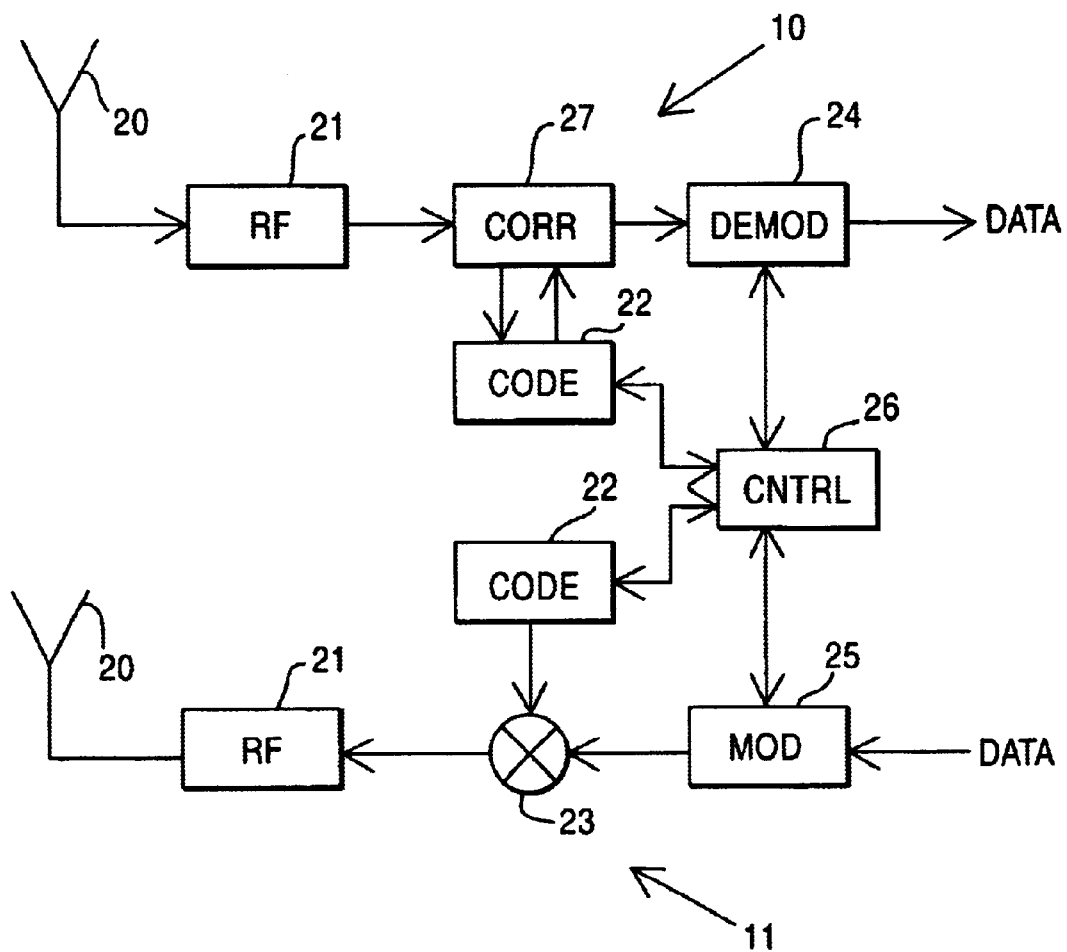
FIG. 2 illustrates a block diagram of a transceiver.

FIG. 1 shows a typical CDMA radio system. The radio system comprises cells, each cell typically including one base station 1 and 2 and a number of subscriber terminals 3 to 5, preferably mobile phones. Both the base station 1 and 2 and the subscriber terminal 3 to 5 comprises at least one transceiver through which connections 6 between the subscriber terminals 3 to 5 and the base stations 1 and 2 are established and maintained. The subscriber terminals 3 to 5, preferably mobile phones, and the base stations 1 and FIG. 2 shows a block diagram of a typical transceiver including a receiver 10 and a transmitter 11. The transceiver comprises an antenna 20, radio frequency means 21, a transmitter multiplier 23, coding means 22, a demodulator 24, a modulator 25, control means 26 and a receiver multiplier 27. Digital data, for example synchronizing-related data such as Sync Channel Message to be transmitted in the transmitter is modulated in the modulator 25. The data can be processed in the modulator 25 in many ways for example by means of convolution coding and interleaving. After the modulator 25, the signal to be transmitted is multiplied to a broadband in the multiplier 23 by a spreading code arriving from the coding means 22. The broadband signal formed hereby is converted into radio frequency in the radio frequency means 21 wherein the broadband digital signal is typically multiplied by a high-frequency analog signal of a local oscillator and is then high-pass filtered. The radio frequency signal obtained hereby is transmitted by means of the antenna.

FIG. 2 shows a block diagram of a typical transceiver including a receiver 10 and a transmitter 11. The transceiver comprises an antenna 20, radio frequency means 21, a transmitter multiplier 23, coding means 22, a demodulator 24, a modulator 25, control means 26 and a receiver multiplier 27. Digital data, for example synchronizing-related data such as Sync Channel Message to be transmitted in the transmitter is modulated in the modulator 25. The data can be processed in the modulator 25 in many ways for example by means of convolution coding and interleaving. After the modulator 25, the signal to be transmitted is multiplied to a broadband in the multiplier 23 by a spreading code arriving from the coding means 22. The broadband signal formed hereby is converted into radio frequency in the radio frequency means 21 wherein the broadband digital signal is typically multiplied by a high-frequency analog signal of a local oscillator and is then high-pass filtered. The radio frequency signal obtained hereby is transmitted by means of the antenna.

At the receiver part 10, the antenna 20 receives the signal propagating to the radio frequency means 21 wherein the signal is typically multiplied by a high-frequency analog signal of a local oscillator and is then low-pass filtered. The remaining wide-band signal is digitized and multiplied in the multiplier 27 by the spreading code of the receiver, the spreading code arriving from the coding means 22. In the present block diagram, the multiplier 27 also comprises a correlator wherein the code phase is being searched. The output of the multiplier 27 thus includes a narrow-band signal containing digital information, the signal being demodulated in the demodulator 24 by means of for example deconvolution coding and de-interleaving. The transceiver operation is typically controlled by the control means 26.

Let us have a closer look at the spreading code searching process when a CDMA receiver is being synchronized. The synchronizing channel is directed from the base station to the subscriber terminal and it is used for synchronizing the connection between the subscriber terminal and the base station. Once the subscriber terminal is synchronized to the radio system, the subscriber terminal does not usually re-use the synchronizing channel. A synchronizing-channel frame is as long as the pseudo-random sequence of a pilot signal, and the frame is transmitted simultaneously with the pilot sequence. Since each base station has different pilot sequence time offsets, timings of the frames of the synchronizing channels also differ in each base station. Thus, synchronizing to the pseudo-random sequence of the pilot signal facilitates the synchronization of the subscriber terminal to the synchronizing channel. Synchronization is difficult because the cross-correlations between different spreading codes are typically too high and because the mutually corresponding spreading codes have the same duration in time and usually also the length in chips in different connections.

Let us assume that the receiver attempts to find a desired spreading code of a particular user from the group of spreading codes of K users. The search is carried out by forming a correlation between the received signal and the desired spreading code derived from the local coding means 22. The correlation is obtained for example from $$C(n) = \sum_{k=1}^{N} S_p(k) * S_r(n-k), \quad (1)$$

where $S_p$ and $S_r$ are the spreading codes, n is the sample, k is the phase delay and N stands for the code length. If in the formula (1) the correlation subindex p is r, i.e. p=r, auto correlation is involved. In contrast, if in the formula (1) p is not r, i.e. p≠r, cross-correlation is involved. The output signal y(t) of the correlator 27 during one data symbol is $$y(t) = x_0(t) + \sum_{k=1}^{N-1} x_k(t) + n(t), \quad (2)$$

where $x_0(t)$ is the autocorrelation result of the spreading code signal to be searched, the sum term is the cross-correlation result of the other spreading code signals and n(t) is stands for the noise.

Let us study the method of the invention in more detail. At least in one connection 6 in the synchronizing phase between the subscriber terminal 3 to 5 and the base station 1 and 2, the connection being typically a unidirectional connection from the base station to the subscriber terminal, the data to be transmitted is multiplied by the spreading code whose duration in time or the length in chips differs from the corresponding spreading code in the other connections. A spreading code of a different length is not preferably employed in every connection in the synchronizing phase, but the radio system also comprises connections employing the spreading code of the same length, the connections forming a group of similar connections. The radio system comprises, however, a number of connection groups wherein the data in the synchronizing phase is multiplied by a spreading code deviating from the corresponding spreading code in the other groups. If one connection in the radio system employs a number of spreading codes affecting the signal at different levels or in different ways, the corresponding spreading code is taken to mean the spreading code at the same level or the spreading code affecting the signal in the same way.

The signal can be transmitted both at a chip frequency and at a symbol frequency on different connections in the synchronizing phase. Thus, the spreading code correlation of different connections is as low as possible. The duration in time of the spreading code can be preferably changed for each symbol in each connection. Thus, each symbol to be transmitted is preferably multiplied by a spreading code whose duration in time differs from the corresponding spreading code in the other connections. The duration in time of the spreading codes can differ from one another preferably by one or more chips.

A fixed chip frequency can also be employed as a spreading code chip frequency, whereby the symbol frequency changes according to the duration in time of the spreading code and particularly in this case according to the chip length. When the fixed symbol frequency is used, the correlation between the spreading codes is reduced by employing a variable chip frequency and the duration in time of the spreading code on different connections. The receiver forms a correlation between the received signal and the spreading code of the signal to be detected and the correlation is averaged over several symbols, whereby the effect of the other spreading codes on the signal to be detected is reduced and the signal can be detected better.

Figure 3:
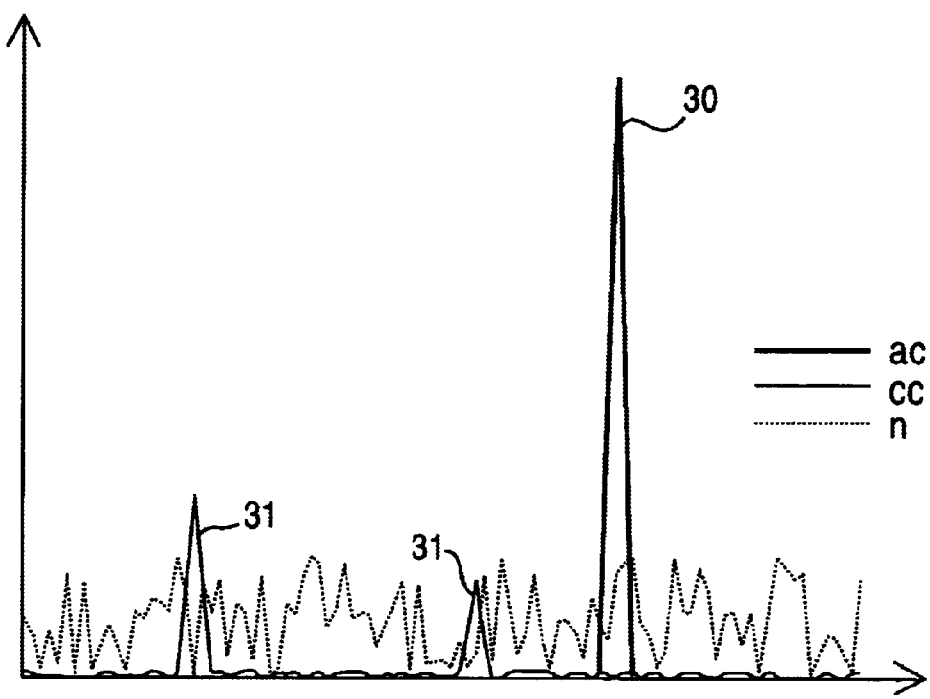
FIG. 3 illustrates cross-correlation between two spreading codes.

Let us study the solution of the invention in more detail by means of FIGS. 3 to 6. FIG. 3 shows a typical autocorrelation graph ac of a spreading code, a cross-correlation graph cc of any two spreading codes and a noise graph n. The autocorrelation function ac and the cross-correlation function cc of the spreading codes remain the same from one symbol to the other. The autocorrelation peak is at point 30. Different spreading codes correlate slightly more than on average at points 31. Correlation peaks caused by the noise are random and their intensity and location differ from one symbol to the other. The noise effect on the output signal of the correlator y(t) can be reduced by averaging the correlation result over several symbols. However, this does not lower or shift the maximum points of the cross-correlation in different spreading codes, since the spreading codes are of the same length and alike for all the symbols.

Figure 4:
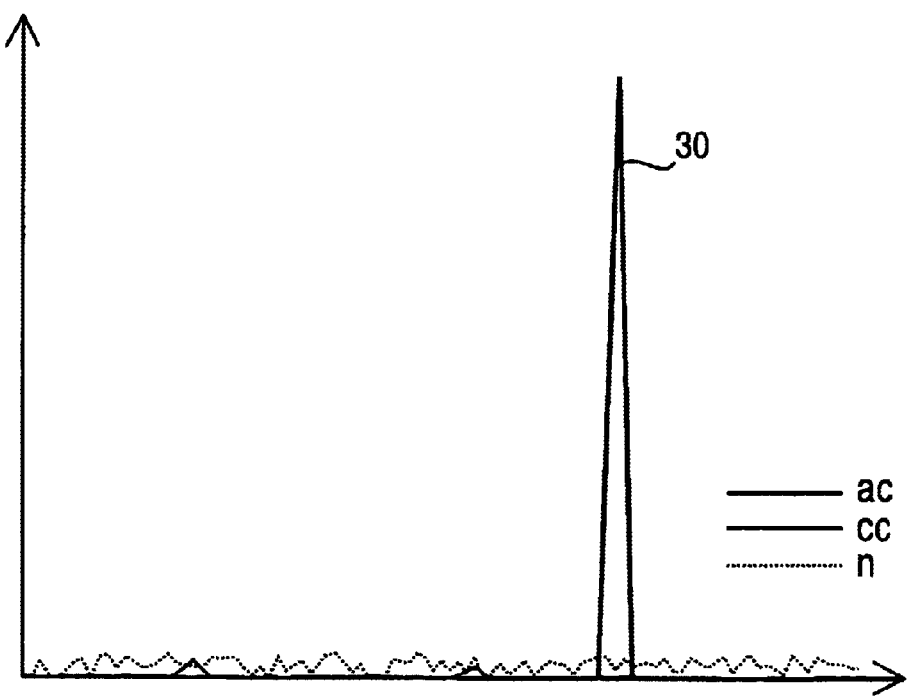
FIG. 4 illustrates cross-correlation between two spreading codes.

When the spreading codes of different users are of different lengths, the cross-correlation between the spreading codes varies from one symbol to the other. The duration of the first spreading code, i.e. in this case the length is $N_0$ and the length of the second spreading code is $N_1=N_0\pm\Delta N$, where $N_0$ and $N_1$ stand for the number of chips and $\Delta N$ represents one spreading code chip or several spreading code chips. Averaging the cross-correlation result over a number of chips causes the maximum points of the cross-correlation result to be reduced, since the cross-correlation results are different at different periods of time due to the different lengths of the spreading codes. A difference of even a chip or a fraction of a chip affects the cross-correlation result dramatically, but the difference in length and/or the duration of the spreading codes can differ from one another without a definite quantitative limit. However, a fraction of a chip, one chip or some chips can change the cross-correlation significantly. In this case, some at the most refers to a small quantity in proportion to the length of the spreading code, typically for example about 10% of the total length of the spreading code. FIG. 4 shows the auto-correlation graph ac of the spreading code, the cross-correlation graph cc of any two spreading codes and the noise graph n of the invention averaged over a number of symbols. FIG. 4 shows that only the autocorrelation peak 30 substantially remains.

Figure 5:
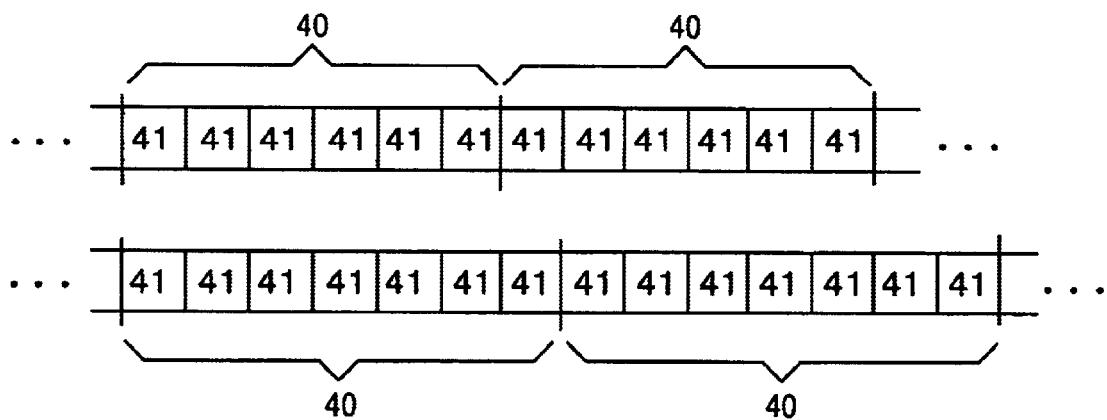
FIG. 5 illustrates spread-coded data at a fixed chip frequency and FIG. 6 illustrates spread-coded data at a fixed symbol frequency.

FIG. 5 illustrates the operation of the inventive idea when the chip frequency of the spreading code is kept constant. Thus, the duration of a data symbol differs in different spreading codes. FIG. 5 comprises data symbols 40 and spreading code chips 41. In FIG. 5, the length of the spreading codes differs by one chip, whereby the spreading codes as if slide or shift by one chip with regard to one another from one symbol to the other. A corresponding shift also takes place in the other length differences of the spreading codes. The shift changes the cross-correlation of the spreading codes in different symbols, whereby the cross-correlation is reduced when averaged over a number of symbols.

Figure 6:
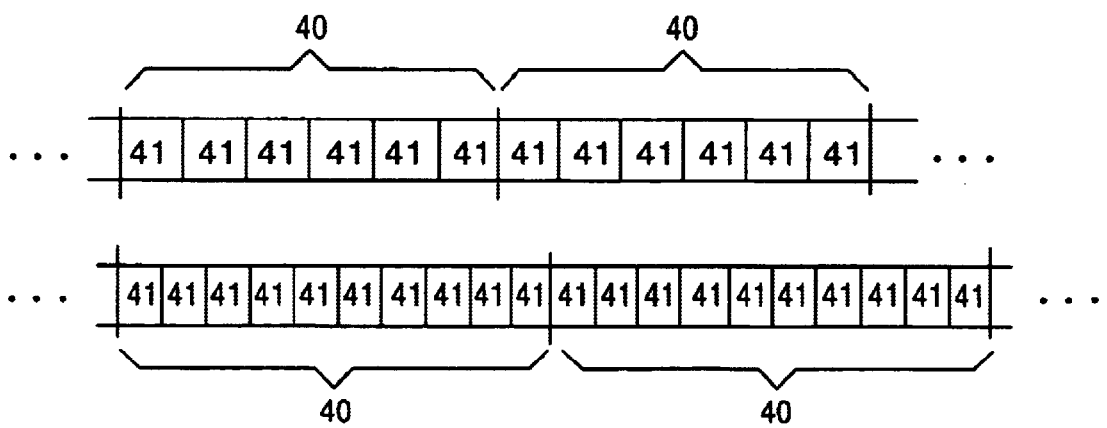

FIG. 6 illustrates the operation of the inventive idea when the chip frequency is not constant. FIG. 6 comprises data symbols 40 and spreading code chips 41. When the chip frequency and also the duration in time or the length are not constant, an efficient shift of the chips 41 and the symbols 40 with regard to one another is obtained, whereby the cross-correlation of the spreading codes is further reduced.

The inventive solution can be implemented for example by using a spreading code bank available to the base station, the spreading code bank containing a group of predetermined spreading codes from which the base station employs a new code whenever it sends a signal required for synchronization in the establishment of a new connection. The group of spreading signals in the spreading signal bank is preferably predetermined. The base station decides upon the way of synchronization. A predetermined time can be employed for the synchronization. If the synchronization fails, the connection must be re-established. Alternatively, the base station can send the signal required for synchronization as long as the subscriber terminal is definitely able to be synchronized to it.

The solutions of the invention can be implemented particularly for digital signal processing by means of for example ASIC or VLSI (Application-Specific Integrated Circuit, Very Large Scale Integration). The operations to be accomplished are preferably implemented as programs based on microprocessor technique.

Although the invention is described above with reference to the example illustrated in the attached drawings, it is to be understood that the invention is not restricted thereto but can be modified in many ways within the scope of the inventive idea presented in the attached claims.

What is claimed is:

1. A method of reducing interference in a radio system comprising at least one base station and a subscriber terminal including a receiver and a transmitter in connection with one another, in the transmitter the data to be transmitted is converted into symbols and each symbol is multiplied by a connection-specific spreading code composed of chips, the method comprising the step:

multiplying data of at least one connection in a synchronizing phase by a spreading code whose duration in time differs from the corresponding spreading code in other connections by some chips at the most in such a way that the cross-correlation of the spreading codes receives different values at different periods of time; and transmitting the data on different connections in the synchronizing phase by employing different chip frequency and symbol frequency.

2. A method as claimed in claim 1, wherein the multiplying step comprises multiplying data to be transmitted in part of the connections in the synchronizing phase by the spreading code whose duration in time differs from the corresponding spreading code in the other connections.

3. A method as claimed in claim 1, wherein the multiplying step comprises multiplying each symbol in the data to be transmitted in the synchronizing phase by the spreading code whose duration in time differs from the corresponding spreading code in the other connections.

4. A method as claimed in claim 1, wherein the multiplying step comprises durations in time of different spreading codes in the synchronizing phase which differ from one another by one or more chips.

5. A method as claimed in claim 1, further comprising employing a fixed chip frequency as a chip frequency for different spreading codes in the synchronizing phase.

6. A method as claimed in claim 1, further comprising employing a fixed symbol frequency as a data symbol frequency in the synchronizing phase.

7. A method as claimed in claim 1, further comprising forming a correlation in the receiver in the synchronizing phase between a received signal and the spreading code of a signal to be detected and averaging the correlation over several symbols whereby the effect of the other spreading codes on the spreading code of the signal to be detected is reduced.

8. A method as claimed in claim 1, further comprising, at the base station, selecting a spreading code from a predetermined group of spreading codes for each connection in the synchronizing phase.

9. A radio system comprising at least one base station and subscriber terminals comprising a receiver and a transmitter arranged to multiply data to be sent by a connection-specific spreading code, which data comprises symbols and which spreading code comprises chips, wherein the radio system is arranged to employ the spreading code in at least one connection in the synchronizing phase, the duration in time of the spreading code differing by some chips at the most from the corresponding spreading code in other connections in such a way that the cross-correlation of the spreading codes receives different values at different periods of time; and in the synchronizing phase, the radio system is arranged to transmit the signal on different connections at a different chip frequency and symbol frequency.

10. A radio system as claimed in claim 9, wherein the radio system is arranged to employ the spreading code in part of the connections in the synchronizing phases, the duration in time of the spreading code differing from the corresponding spreading code in the other connections.

11. A radio system as claimed in claim 9, wherein the radio system is arranged to multiply each symbol to be transmitted in the connection in the synchronizing phase by a spreading code whose duration in time differs from the corresponding spreading code in the other connections.

12. A radio system as claimed in claim 9, wherein the duration time of the different spreading codes in the synchronizing phase differ by one or more chips.

13. A radio system as claimed in claim 9, wherein the chip frequency in different spreading codes is fixed in the synchronizing phase.

14. A radio system as claimed in claim 9, wherein the data symbol frequency is fixed in the synchronizing phase.

15. A radio system as claimed in claim 9, wherein, in the synchronizing phase, the receiver is arranged to
 form a correlation between a received signal and the spreading code of a signal to be detected and to
 average the correlation over a number of symbols whereby the effect of the other spreading codes on the spreading code of the signal to be detected is reduced.

16. A radio system as claimed in claim 9, wherein the base station is arranged to select a spreading code for the connection in the synchronizing phase from the predetermined group of spreading codes.

* * * * *